United States Patent
Charas

(10) Patent No.: US 7,409,704 B1
(45) Date of Patent: Aug. 5, 2008

(54) SYSTEM AND METHOD FOR LOCAL POLICY ENFORCEMENT FOR INTERNET SERVICE PROVIDERS

(75) Inventor: Philippe Charas, Upplands-Väsby (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

(21) Appl. No.: 09/354,418

(22) Filed: Jul. 15, 1999

(51) Int. Cl.
*H04L 29/00* (2006.01)
*H04L 29/02* (2006.01)

(52) U.S. Cl. .............. 726/2; 726/1; 726/3; 726/4; 726/21; 726/27; 713/155; 713/157; 713/158; 713/159; 709/225; 709/224; 709/223; 709/227

(58) Field of Classification Search ......... 713/200–202, 713/182, 153, 162, 155; 455/3.04, 407–408, 455/411; 709/223–229; 380/247, 250
See application file for complete search history.

(56) References Cited

U.S. PATENT DOCUMENTS

| | | | | |
|---|---|---|---|---|
| 5,091,942 A * | 2/1992 | Dent | ................ | 380/46 |
| 5,299,263 A * | 3/1994 | Beller et al. | ................ | 380/30 |
| 5,706,427 A | 1/1998 | Tabuki | ................ | 395/187.01 |
| 5,761,309 A | 6/1998 | Ohashi et al. | ................ | 380/25 |
| 5,815,665 A | 9/1998 | Teper et al. | ................ | 395/200.59 |
| 5,828,833 A | 10/1998 | Belville et al. | | |
| 5,841,864 A | 11/1998 | Klayman et al. | ................ | 380/21 |
| 5,864,683 A | 1/1999 | Boebert et al. | | |
| 5,881,234 A | 3/1999 | Schwob | ................ | 395/200.49 |
| 5,889,958 A | 3/1999 | Willens | ................ | 395/200.59 |
| 5,898,780 A | 4/1999 | Liu et al. | ................ | 380/25 |
| 6,047,072 A * | 4/2000 | Field et al. | ................ | 380/283 |
| 6,298,383 B1 * | 10/2001 | Gutman et al. | ................ | 709/229 |
| 6,317,830 B1 * | 11/2001 | Stolz | ................ | 713/168 |
| 6,580,906 B2 * | 6/2003 | Bilgic et al. | ................ | 455/422.1 |
| 6,651,101 B1 * | 11/2003 | Gai et al. | ................ | 709/224 |
| 6,718,380 B1 * | 4/2004 | Mohaban et al. | ................ | 709/223 |
| 6,751,205 B2 * | 6/2004 | Menon et al. | ................ | 370/328 |
| 6,854,014 B1 * | 2/2005 | Amin et al. | ................ | 709/227 |
| 6,880,009 B2 * | 4/2005 | Charas | ................ | 709/226 |
| 7,321,583 B2 * | 1/2008 | Hahn et al. | ................ | 370/349 |

(Continued)

FOREIGN PATENT DOCUMENTS

EP   0 748 095 A2   12/1996

(Continued)

OTHER PUBLICATIONS

Charas, Ericsson Research, Local Policy Enforcement, Unbundling of the Local Loop.*

(Continued)

*Primary Examiner*—Syed A. Zia

(57) ABSTRACT

A telecommunications system and method is disclosed for implementing a Policy Enforcement Point (PEP) for an Internet Service Provider (ISP) at the subscriber premises. This PEP enforces policies with respect to authentication of subscribers, authorization to access and services, accounting and mobility of the subscribers. These policies are defined by the ISP operator in a Policy Decision Point (PDP), which is a server connected to the Internet that communicates with the PEP. In addition, the ISP can supply an encryption key for the PEP and an encryption key for a particular subscriber. Thus, all communications between the subscriber and the PEP, as well as between the PEP and the PDP can be encrypted.

32 Claims, 4 Drawing Sheets

U.S. PATENT DOCUMENTS

| | | |
|---|---|---|
| 2004/0039803 A1* | 2/2004 | Law .......................... 709/223 |
| 2004/0054766 A1* | 3/2004 | Vicente ...................... 709/223 |
| 2005/0021978 A1* | 1/2005 | Bhat et al. .................. 713/182 |
| 2007/0050842 A1* | 3/2007 | Smith et al. ................. 726/12 |
| 2008/0066148 A1* | 3/2008 | Lim ............................. 726/1 |

FOREIGN PATENT DOCUMENTS

| | | |
|---|---|---|
| WO | WO 98/02828 | 1/1998 |
| WO | WO 98/32301 | 7/1998 |

OTHER PUBLICATIONS

Charas, Ericsson Research, Local Policy Enforcement, Unbundling of the Local Loop, (ISSLS2000), Jun. 2000.*

* cited by examiner

SYSTEM AND METHOD FOR LOCAL POLICY ENFORCEMENT FOR INTERNET SERVICE PROVIDERS

BACKGROUND OF THE PRESENT INVENTION

1. Field of the Invention

The present invention relates generally to telecommunications systems and methods for accessing the Internet using an Internet Service Provider (ISP), and specifically to authenticating and authorizing users to use the ISP resources and services.

2. Background and Objects of the Present Invention

The confluence of two forces, deregulation and the impact of the Internet Protocol (IP), are making possible a horizontal segmentation of the telecommunications market. Earlier attempts to horizontally slice the telecommunications markets by liberating terminals and long distance have proven to be slow and rather non-convincing to the subscriber.

Today, the unbundling of the local loop, and the separation of the services from the infrastructure, together with the advent of IP, has thoroughly altered the relationship between the subscriber and the service provider. Transparent IP-based networks provided by Internet Service Providers (ISPs), which permit exchange of service and accounting policies between network segments, have allowed a physical dislocation of the subscriber from the ISP. Thus, permitting an operator to have subscribers anywhere, and in almost any network in the world.

For example, new customer segments can be created along criteria other than physical location, such as nationality, corporate affiliation, religion, culture, specific interests, etc. In addition, IP-based Virtual Private Networks (VPN) can be easily created to cater for scattered individuals and groups.

The key to this ultimate separation of the services from the infrastructure is the existence of a local Policy Enforcement Point (PEP). The PEP is responsible for enforcing policies with respect to authentication of subscribers, authorization to access and services, accounting and mobility, etc. Normally, the PEP would be located in a local access server or edge router of the ISP. However, implementing the PEP at the edge router typically requires substantial investments and many practical arrangements with, and dependency of, local access providers concerning policy enforcement.

It is, therefore, an object of the present invention to reduce the investment cost for ISPs implementing a PEP.

SUMMARY OF THE INVENTION

The present invention is directed to telecommunications systems and methods for implementing a Policy Enforcement Point (PEP) for an Internet Service Provider (ISP) at the subscriber premises. The PEP is responsible for enforcing policies with respect to authentication of subscribers, authorization to access and services, accounting and mobility of the subscribers. These policies are defined by the ISP operator in a Policy Decision Point (PDP), which is a server connected to the Internet that communicates with the PEP. In addition, the ISP can supply an encryption key for the PEP and an encryption key for a particular subscriber. Thus, all communications between the subscriber and the PEP, as well as between the PEP and the PDP can be encrypted.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
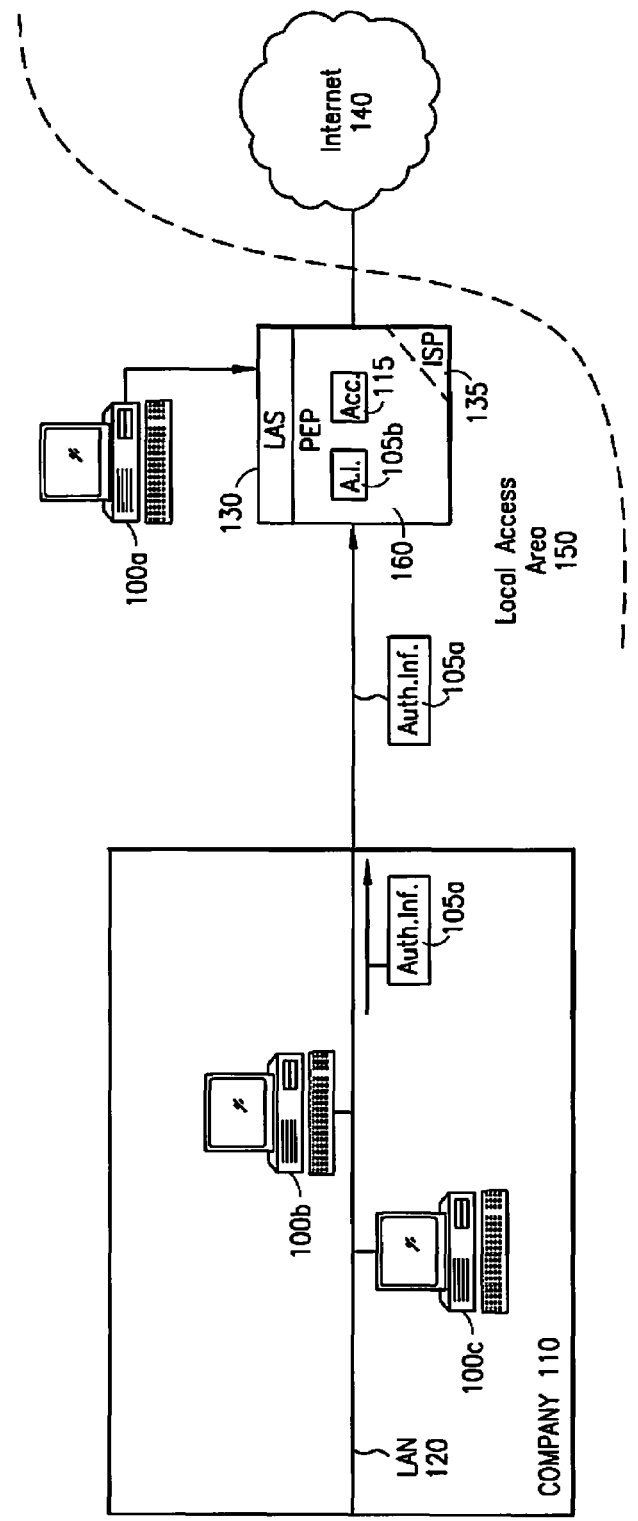
FIG. 1 is a block diagram illustrating conventional policy enforcement by an Internet Service Provider (ISP)

With reference now to FIG. 1 of the drawings, conventionally, a single subscriber 100a or a company 110 having multiple subscribers 100b and 100c, only two of which are shown, connected together though a Local Area Network (LAN) 120 access the Internet 140 through a local access server 130 (or edge router) of an Internet Service Provider (ISP) 135. The local access server 130 serves as a local policy enforcement point (PEP) 160 for the ISP 135 in an area 150 that the local access server 130 serves. The PEP 160 is responsible for enforcing policies with respect to authentication of subscribers 100a-c in the area, authorization to access and services, accounting and mobility.

Prior to initiating an Internet session, the PEP 160 must authenticate a subscriber, for example, subscriber 100b. Typically, the subscriber 100b supplies authentication information 105a, such as an account number and personal identification number (PIN), to the local access server 130 of the ISP 135. Thereafter, the PEP 160 within the local access server 130 authenticates the subscriber 100b by comparing the received authentication information 105a provided by the subscriber 100b with authentication information 105b associated with that subscriber 100b stored within the PEP 160. It should be noted that the PEP 160 within the local access server 130 stores the authentication information 105 for every subscriber 100a-c that it serves. Once authenticated, the subscriber 100b can access the Internet 140 and browse the web through the local access server 130. When the Internet session is completed, the PEP 160 collects and stores accounting and billing information 115 for the Internet session.

Currently, none of the information transmitted between the subscriber 100b and the local access server 130 or PEP 160 during an Internet session is encrypted. Therefore, this information, including the authentication information 105, is susceptible to interception by an unauthorized party. The current policing mechanisms by the ISP 135 do not account for this type of unauthorized access. Therefore, the ISP 135 must rely upon the policing mechanisms of the local access provider in the area 150 to help ensure authentication, which increases the cost to ISPs 135 and to subscribers 100a-c that use the ISP 135 services. In addition, certain accounting and billing information needed by the ISP 135 can only be provided by the local access provider, which also increases the cost to the ISP 135.

Figure 2:
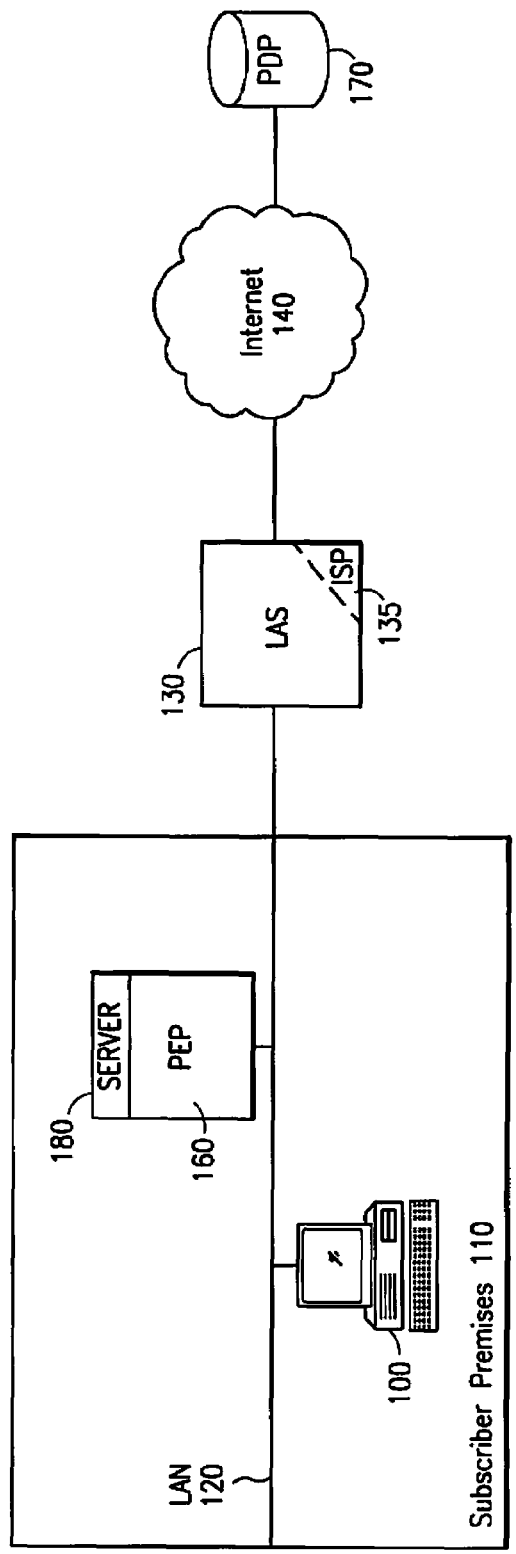
FIG. 2 is an exemplary block diagram illustrating the implementation of a local policy enforcement point (PEP) at the customer premises in accordance with preferred embodiments of the present invention.

However, if, as shown in FIG. 2 of the drawings, the PEP 160 is located in the subscriber premises 110, such as being connected to the LAN 120 that the subscriber 100 is connected to, the up-front investments required to become an ISP 135 would be reduced. In addition, the ISP 135 would become less dependent on the local access provider. Therefore, in accordance with preferred embodiments of the present invention, the PEP 160 can be implemented within a server (or service node) 180 connected to the LAN 120 of the subscriber(s) 100, as is shown. Alternatively, if the subscriber 100 is a single subscriber, the PEP 160 can be implemented within the computer or terminal associated with that subscriber 100.

To implement the PEP 160 at the subscriber premises 110, when a subscriber 100 or a group of subscribers registers with an ISP 135, the ISP 135 can provide software for the PEP 160 to the subscriber(s) 100. This software can be downloaded from the ISP 135 over the Internet 140 or can be mailed to the subscriber(s) 100. The software contains a separate subscriber key for each of the subscribers 100 and a PEP key for the PEP 160. This software for the PEP 160 can be loaded onto a server 180 serving multiple subscribers 100, as is shown, or onto a terminal associated with a single subscriber 100 to carry out the functions of the PEP 160. For example, the software could be loaded onto an e-Box, which is a secure server 180 with a built-in firewall capability that has an interface to the LAN 120. Once loaded, the subscribers 100 can each be assigned one of the subscriber keys and the PEP 160 can register the PEP key with the local access server 130.

As discussed above, the PEP 160 enforces policies with respect to authentication of subscribers 100, authorization to access and services, accounting and mobility for the subscribers that the PEP 160 serves. These policies are defined by the ISP 135 operator in a Policy Decision Point (PDP) 170, which is a server under operator control that can be situated anywhere in the world. The PDP 170 communicates with PEPs 160 and with other network PDPs (not shown) to authenticate subscribers 100 that are roaming outside of their home network.

For example, if the LAN 120 is part of a company that has offices in several locations, and a subscriber 100 associated with one of the locations is visiting the LAN 120 location, the authentication information 105 associated with that subscriber 100 may not be stored in the PEP 160 of the LAN 120. Instead, the authentication information 105 may be stored in another PEP (not shown) of the ISP 135. Therefore, when the visiting subscriber 100 attempts to access the Internet 140 through the ISP 135, the PEP 160 can send the authentication information 105 received from the subscriber 100 to the PDP 170 through the local access server 130 and the Internet 140 to authenticate the subscriber 100. Based upon the visiting subscribers' authentication information 105, the PDP 170 can authenticate the subscriber 100 directly (if the PDP 170 stores all of the authentication information 105 for all of the subscribers 100 registered with the ISP 135). Alternatively, the PDP 170 can determine the PEP (not shown) associated with the visiting subscriber 100, transmit this authentication information 105 to that PEP and request authentication and authorization from that PEP.

As another example, if a subscriber 100 connected to the LAN 120 has an account with another ISP (not shown), but is attempting to access the Internet 140 through the ISP 135 of the LAN 120, the PEP 160 can contact the PDP 170 through the local access server 130 associated with the ISP 135 and the Internet 140 to authenticate the subscriber 100 and obtain authorization to access the ISP 135. The PDP 170 can communicate with a PDP (not shown) of the ISP that the subscriber 100 has an account with to verify that the subscriber 100 has an account with that ISP and to obtain authorization for billing and charging purposes.

Figure 3:
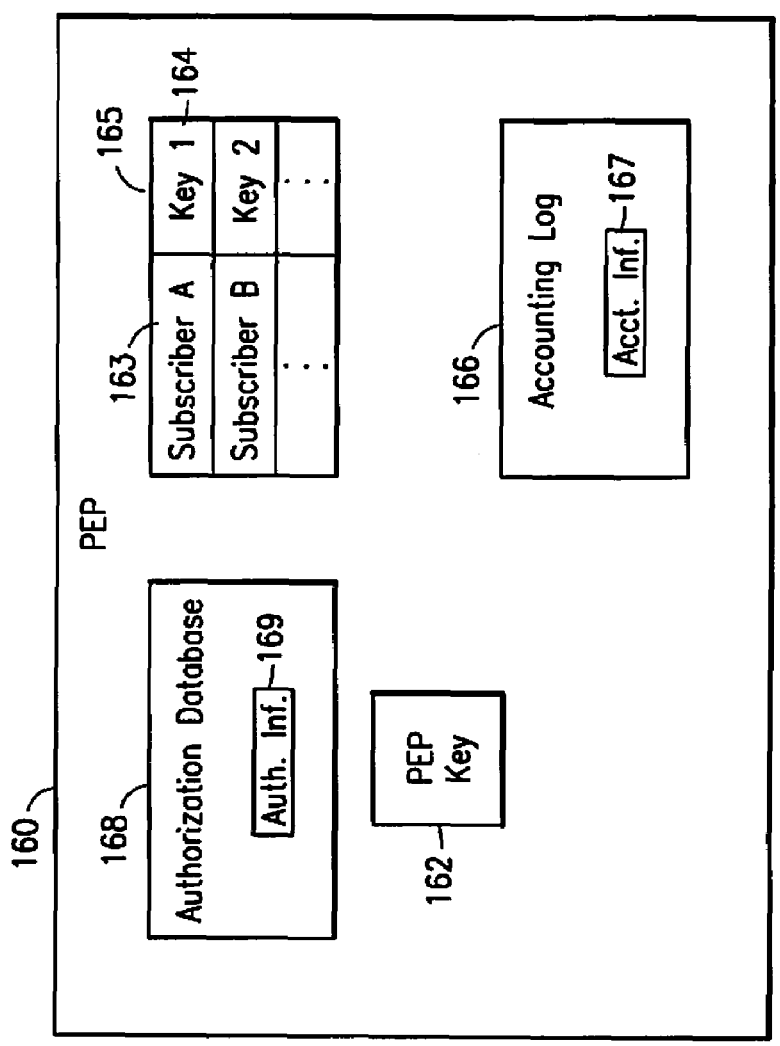
FIG. 3 is a detailed view of the local PEP in accordance with embodiments of the present invention.

The structure and operation of an exemplary embodiment of the PEP 160 will now be described in more detail with reference to FIG. 3 of the drawings. Each PEP 160 has a separate key 162 associated with it. This key 162 identifies the PEP 160 to the PDP 170 and local access server 130 of the ISP 135. Therefore, instead of storing authentication information 105 for each subscriber 100, the local access server 130 only needs to store the PEP keys 162 for the PEPs 160 that it serves. The PEP keys 162 can also be used to encrypt the information transmitted between the PEP 160 and the local access server 130 and between the PEP 160 and the PDP 170, which greatly reduces the possibility of interception by an unauthorized party.

To initiate an Internet session, the PEP 160 provides this PEP key 162 to the local access server 130 to authenticate the PEP 160. Thereafter, the PEP 160 and local access server 130 can use this PEP key 162 to encrypt all of the information transmitted between them. Likewise, the PEP key 162 can be used by the PEP 160 and the PDP 170 to encrypt information transmitted therebetween. Such information can include, for example, authentication information 105 and authorization information of visiting or roaming subscribers 100 or accounting and billing information 115 at the completion of an Internet session.

The PEP 160 also includes a memory or database 165 for storing a different subscriber key 164 for each subscriber 100 that it serves. For example, in the database 165, the PEP 160 can store a list of subscriber user names or account numbers 163 and associated subscriber keys 164. To initiate an Internet session, a subscriber 100 must provide their account number 163, along with their subscriber key 164 to the PEP 160. The PEP 160 accesses the database 165 and compares the received account number 163 and key 164 with the stored account number 163 and key 164 to authenticate the subscriber 100. This subscriber key 164 can also be utilized to encrypt all of the information transmitted between the PEP 160 and the subscriber 100.

In addition, the PEP 160 can also store an authorization database 168 that contains authorization information 169 for each subscriber 100 that it serves. Certain services offered by the ISP 135 may not be available to each subscriber 100. Therefore, after authentication, when a subscriber 100 requests a service from the ISP 135, the PEP 160 can access the authorization database 168 to determine if the subscriber is allowed to use this service based upon the authorization information 169.

During the Internet session, the PEP 160 maintains an accounting log 166 containing information 167 pertaining to the session, such as the start time, stop time and services utilized. This accounting log 166 is used by the ISP 135 for billing and auditing purposes. At completion of the Internet session, the PEP 160 forwards this accounting log 166, using the PEP key 162, to the PDP 170. Alternatively, the accounting log 166 for all subscribers 100 served by the PEP 160 can be transmitted at regular intervals, such as at the end of the day.

By placing the PEP 160 in the premises 110 of the subscriber 100, the overhead is reduced due to the decreased number of messages transmitted between the subscriber 100 and the local access server 130. In addition, the security is increased and the delay is decreased in all communications between the subscriber 100 and the PEP 160.

Figure 4:
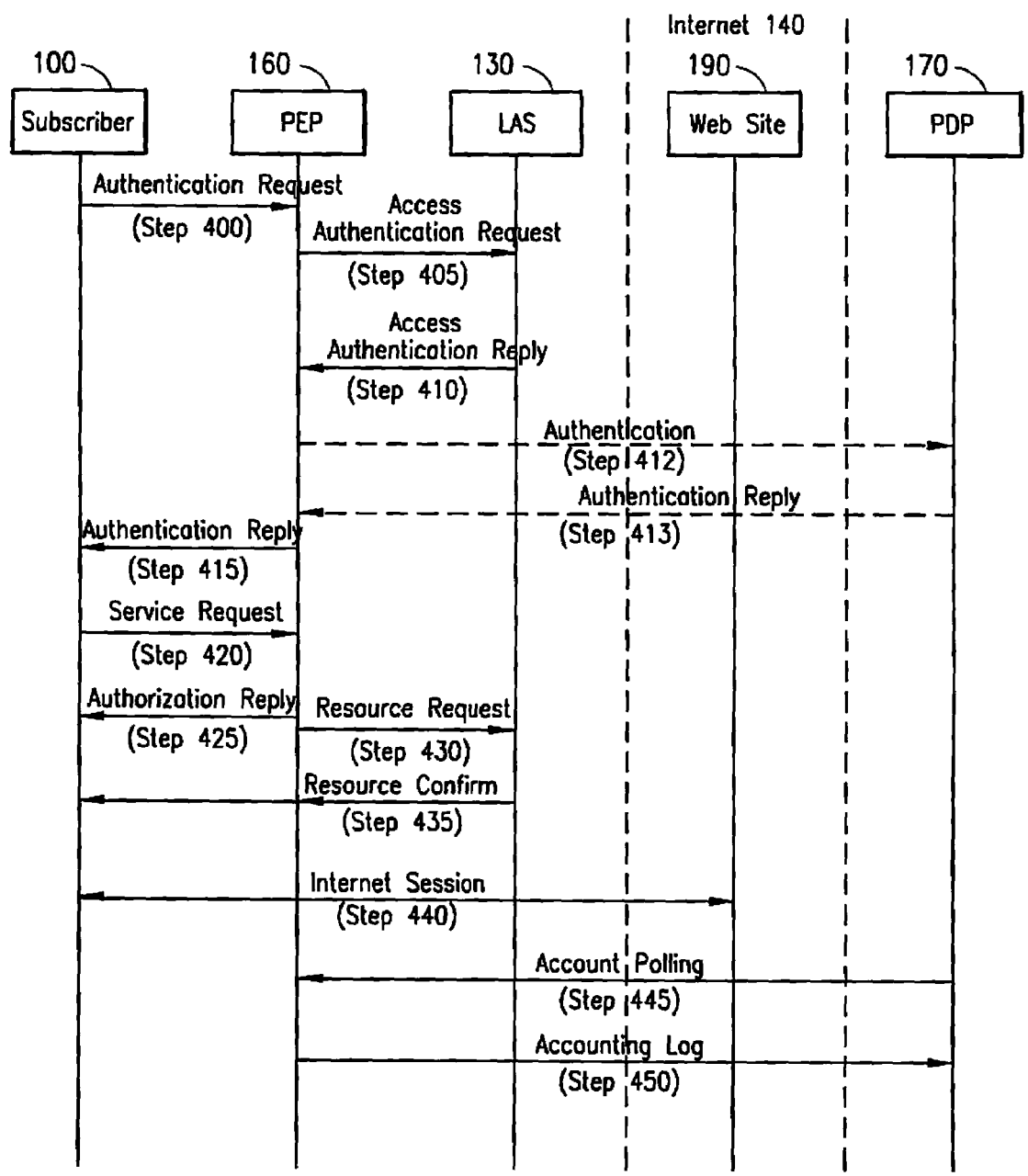
FIG. 4 is an exemplary signaling diagram illustrating the signaling involved in a sample Internet session in accordance with embodiments of the present invention.

With reference now to the signaling diagram shown in FIG. 4 of the drawings, which will be described in connection with the block diagrams shown in FIGS. 2 and 3 of the drawings, to initiate an Internet session, a subscriber 100 sends an authentication request (step 400), including the account number 163 and subscriber key 164, to the PEP 160. Thereafter, the PEP 160 establishes a connection with the local access server 130 of the ISP 135 and sends an access authentication request (step 405), including the PEP key 162, to the local access server 130.

After authentication of the PEP 160, the local access server 130 sends an access authentication reply message (step 410) to the PEP 160, indicating that the PEP 160 is authorized to conduct an Internet session with the ISP 135. When the PEP 160 receives the authentication reply message from the local access server 130, the PEP 160 authenticates the subscriber, using the account number 163 and subscriber key 164 provided by the subscriber 100, and sends an authentication reply message (step 415) to the subscriber 100.

If the subscriber 100 is a roaming subscriber 100, as discussed above, in order to authenticate the subscriber 100, the PEP 160 sends an authentication message, including both the PEP key 162 and the account number 163 and subscriber key 164 for the subscriber 100 to the PDP 170 via the local access server 130 and the Internet 140 (step 412). It should be understood that if the roaming subscriber 100 has an account with another ISP (not shown), the identification of this ISP, along with the subscriber's 100 account number with that ISP is sent to the PDP 170. In order for that roaming subscriber 100 to have access to the ISP 135 of the PEP 160, the two ISP's will typically have a contract allowing subscriber's to have access to either ISP. In addition, charging and accounting information would also need to be addressed in the contract.

Thereafter, the PDP 170 authenticates the subscriber 100 directly or by querying another PEP (not shown) containing the account number 163 and subscriber key 164 for the subscriber 100 or by querying another PDP (not shown). Once authenticated, the PDP 170 returns the authentication reply message to the PEP 160 (step 413), which in turn, sends the authentication reply message to the subscriber 100 (step 415).

Once the subscriber 100 receives the authentication reply message, the subscriber 100 can transmit a service request (step 420) to the PEP 160. The service request can be, for example, a request to access a web site 190 or retrieve subscriber or network information. If the PEP 160 determines that the requested service is not authorized, the PEP 160 sends an authorization reply (step 425) indicating that the service is not allowed. However, if the requested service is allowed, the PEP 160 sends the authorization reply message (step 425) indicating that the service is allowed, and transmits a resource request message (step 430), including the service request, to the local access server 130.

If the requested service cannot be provided to the subscriber 100, the local access server 130 notifies the subscriber 100 by sending a resource confirm message (step 435) indicating that the service is not available to the subscriber 100 via the PEP 160. The requested service may not be able to be provided if, for example, the network is busy or if the service is unavailable at the time. However, if the requested service can be provided, the resource confirm message (step 435) indicates that the service is available. Thereafter, the subscriber 100 can conduct the Internet session (step 440), for example, by retrieving information from or providing information to a web site 190 on the Internet 140. Advantageously, by using the subscriber key 164 and the PEP key 162, all of the information transmitted between the subscriber 100 and the local access server 130 can be encrypted, preventing unauthorized access to this information.

During the Internet session (step 440), the PEP 160 logs, in the accounting log 166, all of the information 167 about the Internet session, such as the start time, stop time and service requested. At periodic intervals, the PDP 170 can transmit an account polling message (step 445) to the PEP 160, requesting the accounting log 166 for all Internet sessions that have occurred since the previous account polling message. In response, the PEP 160 transmits the accounting log (step 450), which includes the records of each Internet session completed prior to receiving the account polling message, to the PDP 170. Alternatively, at completion of the Internet session, the PEP 160 can retrieve the accounting log 166 and send this accounting log 166 to the PDP 170 (step 450) without waiting for the account polling message (step 445). It should be understood that the accounting log 166 can be encrypted for transmission from the PEP 160 to the PDP 170 using the PEP key 162.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. An on-premises policy enforcement point (PEP), said PEP being housed within a subscriber premises associated with a plurality of subscribers who utilize an Internet Service Provider (ISP) to access the Internet, said PEP comprising:

a PEP key;

PEP authentication means for sending the PEP key to an ISP node external to the premises, said ISP node utilizing the PEP key to authenticate the PEP without authenticating individual subscribers;

subscriber authentication means for locally authenticating within the PEP, each of the plurality of subscribers in response to receiving Internet access requests from the subscribers; and policy enforcement means responsive to the subscriber authentication means for locally authorizing within the PEP, each of the plurality of subscribers to access Internet services to which the subscribers subscribe while preventing the subscribers from accessing services to which the subscribers do not subscribe, said policy enforcement means operating independently of the external ISP node to authenticate subscribers and enforce policies without communicating with the external access node.

2. The on-premises PEP of claim 1, wherein the policy enforcement means includes an authorization database for storing authorization information associated with the plurality of subscribers.

3. The on-premises PEP of claim 1, further comprising:

an accounting log for recording session information associated with an Internet session initiated by each of the plurality of subscribers.

4. The on-premises PEP of claim 1, wherein the subscriber authentication means includes:

a memory for storing a subscriber key for each of the plurality of subscribers; and means for receiving from a given subscriber, the Internet access request, said request including authentication information relating to the subscriber key for the given subscriber.

5. The on-premises PEP of claim 4, wherein said subscriber key is used to encrypt information transmitted between the on-premises PEP and each of the plurality of subscribers.

6. The on-premises PEP of claim 1, wherein the PEP key is used to encrypt information transmitted between the on-premises PEP and the ISP node.

7. The on-premises PEP of claim 1, wherein said subscriber premises includes a local area network, said on-premises PEP being a server connected to said local area network.

8. The on-premises PEP of claim 1, wherein said subscriber premises is a terminal associated with the plurality of subscribers.

9. A telecommunications system for conducting an Internet session by at least one subscriber using an Internet Service Provider, said system comprising:
- a policy enforcement point of the Internet Service Provider, said policy enforcement point being housed within a subscriber premises associated with the at least one subscriber, said policy enforcement point including:
  - means for receiving a subscriber key from the at least one subscriber when the at least one subscriber initiates the Internet session, wherein the subscriber key is associated with a specific subscriber;
  - authentication means for utilizing the subscriber key to locally authenticate within the policy enforcement point, the at least one subscriber;
  - means for sending a policy enforcement point key to the Internet Service Provider for authentication of the policy enforcement point; and
  - policy enforcement means for authorizing the at least one subscriber to access services to which the subscriber subscribes while preventing the subscriber from accessing services to which the subscriber does not subscribe; and
- an access node of the Internet Service Provider located outside of the subscriber premises, said access node including:
  - means for receiving the policy enforcement point key from the policy enforcement point; and
  - means for utilizing the policy enforcement point key to authenticate the policy enforcement point;
- wherein the policy enforcement means within the policy enforcement point operates independently of the access node, to authenticate subscribers and enforce policies without communicating with the access node.

10. The telecommunications system of claim 9, wherein said policy enforcement point has a memory therein for storing a stored subscriber key for said at least one subscriber, said stored subscriber key being compared with said received subscriber key to authenticate said at least one subscriber.

11. The telecommunications system of claim 9, wherein said policy enforcement point includes an authorization database for storing authorization information associated with said at least one subscriber.

12. The telecommunications system of claim 11, wherein said policy enforcement point receives a request for service from said at least one subscriber and accesses said authorization database to determine whether said requested service is authorized using said authorization information, said Internet session being conducted when said requested service is authorized.

13. The telecommunications system of claim 9, wherein said policy enforcement point includes an accounting log for recording session information associated with said Internet session.

14. The telecommunications system of claim 13, wherein said session information comprises a start time a stop time and at least one requested service.

15. The telecommunications system of claim 9, wherein said subscriber key is used to encrypt information transmitted between said policy enforcement point and said at least one subscriber during said Internet session.

16. The telecommunications system of claim 9, wherein said policy enforcement point key is used to encrypt information transmitted between said policy enforcement point and said access node during said Internet session.

17. The telecommunications system of claim 9, wherein said subscriber premises includes a local area network, said policy enforcement point being a server connected to said local area network.

18. The telecommunications system of claim 9, wherein said subscriber premises is a terminal associated with said at least one subscriber.

19. The telecommunications system of claim 9, further comprising:
- a policy decision point of said Internet Service Provider connected to the Internet and accessible by said policy enforcement point through said access node.

20. The telecommunications system of claim 19, wherein said policy enforcement point transmits said policy enforcement point key to said policy decision point to authenticate said policy enforcement point.

21. The telecommunications system of claim 19, wherein said policy enforcement point transmits said subscriber key to said policy decision point to authenticate said at least one subscriber when said at least one subscriber is visiting said subscriber premises.

22. The telecommunications system of claim 19, wherein said policy enforcement point transmits session information associated with said Internet session to said policy decision point upon completion of said Internet session.

23. The telecommunications system of claim 22, wherein said session information is encrypted using said policy enforcement point key, said encrypted session information being transmitted to said policy decision point.

24. A method of establishing an Internet session utilizing an Internet Service Provider (ISP), wherein a subscriber within a subscriber premises requests to establish the session, said method comprising the steps of:
- transmitting a policy enforcement point (PEP) key from an on-premises PEP to an ISP access node located externally to the subscriber premises;
- authenticating by the external access node, the on-premises PEP based on the received PEP key;
- receiving at the on-premises PEP, a request to establish the session from at least one subscriber within the subscriber premises, said request including a subscriber key;
- authenticating by the on-premises PEP, the at least one subscriber based on the received subscriber key without communicating with the external access node; and
- upon successful authentication of the at least one subscriber, locally authorizing by the on-premises PEP, the at least one subscriber to access Internet services to which the subscriber subscribes while preventing the subscriber from accessing services to which the subscriber does not subscribe, said on-premises PEP operating independently of the external access node to authenticate subscribers and enforce policies without communicating with the external access node.

25. The method of claim 24, further comprising the step of:
encrypting information transmitted between the on-premises PEP and the external access node during said Internet session utilizing the PEP key.

26. The method of claim 24, wherein said step of authenticating said at least one subscriber includes the steps of:
storing within the on-premises PEP, a stored subscriber key for said at least one subscriber; and
comparing said stored subscriber key with said received subscriber key to authenticate said at least one subscriber.

27. The method of claim 24, further comprising the steps of:
storing within the on-premises PEP, authorization information associated with said at least one subscriber;
receiving at the on-premises PEP a request for service from said at least one subscriber; and
the on-premises PEP determining whether said requested service is authorized based on said authorization information, and if so, indicating that said Internet session can be conducted.

28. The method of claim 24, further comprising the step of:
during said Internet session, recording within an accounting log within the on-premises PEP, session information associated with said Internet session.

29. The method of claim 28, further comprising the step of:
upon completion of said Internet session, transmitting said session information from the on-premises PEP to a policy decision point of said Internet Service Provider connected to the Internet and located outside of said customer premises.

30. The method of claim 29, wherein said step of transmitting said session information further comprises the step of:
encrypting said session information using a PEP key.

31. The method of claim 24, further comprising:
determining by the on-premises PEP, that the received subscriber key is not found in a subscriber key database within the on-premises PEP;
transmitting the received subscriber key from the on-premises PEP to the external access node; and
authenticating the at least one subscriber by the external access node.

32. The method of claim 24, further comprising the step of:
encrypting information transmitted between the on-premises PEP and said at least one subscriber during said Internet session using said subscriber key.

* * * * *